(12) United States Patent
Rogers et al.

(10) Patent No.: US 8,333,537 B2
(45) Date of Patent: Dec. 18, 2012

(54) NUT LOOSENESS INDICATOR AND DUST CAP

(75) Inventors: Larry K. Rogers, Bordentown, NJ (US); Andy Y. Chen, Mount Laurel, NJ (US)

(73) Assignee: Hutchinson, SA, Paris (FR)

( * ) Notice: Subject to any disclaimer, the term of this patent is extended or adjusted under 35 U.S.C. 154(b) by 606 days.

(21) Appl. No.: 12/454,835

(22) Filed: May 22, 2009

(65) Prior Publication Data

US 2010/0296892 A1 Nov. 25, 2010

(51) Int. Cl.
*F16B 37/14* (2006.01)

(52) U.S. Cl. ........... 411/8; 411/14; 411/337; 411/372.5; 411/372.6; 411/429; 301/35.622; 301/37.374

(58) Field of Classification Search ................ 411/8, 14, 411/331, 337, 372.5, 372.6, 377, 429; 116/212, 116/306, 309, 315; 301/35.622, 37.374
See application file for complete search history.

(56) References Cited

U.S. PATENT DOCUMENTS

| | | | | |
|---|---|---|---|---|
| 4,734,001 A | * | 3/1988 | Bennett | 411/119 |
| 4,906,150 A | * | 3/1990 | Bennett | 411/119 |
| 6,135,691 A | * | 10/2000 | Nadarajah et al. | 411/431 |
| 6,158,933 A | * | 12/2000 | Nicholson | 411/14 |
| 6,270,302 B1 | * | 8/2001 | Lyons | 411/8 |
| 6,398,312 B1 | * | 6/2002 | Marczynski et al. | 301/35.622 |
| 6,561,124 B1 | * | 5/2003 | Marczynski et al. | 116/309 |
| 6,595,597 B2 | * | 7/2003 | Marczynski et al. | 301/37.374 |
| 6,672,547 B1 | * | 1/2004 | Westerberg et al. | 248/74.1 |
| 7,415,888 B2 | * | 8/2008 | Marczynski et al. | 73/761 |
| D610,442 S | * | 2/2010 | Marczynski | D8/399 |
| 7,814,858 B1 | * | 10/2010 | Walczak | 116/309 |
| 8,002,508 B2 | * | 8/2011 | Reed | 411/431 |
| 8,152,426 B2 | * | 4/2012 | Marczynski | 411/14 |
| 2002/0089231 A1 | * | 7/2002 | Marczynski et al. | 301/37.374 |
| 2004/0156693 A1 | * | 8/2004 | Paakko et al. | 411/102 |
| 2006/0181139 A1 | * | 8/2006 | Nilsen et al. | 301/37.374 |
| 2007/0151355 A1 | * | 7/2007 | Marczynski et al. | 73/761 |
| 2010/0296892 A1 | * | 11/2010 | Rogers et al. | 411/8 |
| 2011/0305539 A1 | * | 12/2011 | Rand | 411/373 |

* cited by examiner

*Primary Examiner* — Victor Batson
*Assistant Examiner* — Tyler Johnson
(74) *Attorney, Agent, or Firm* — Steven R. Scott

(57) ABSTRACT

This nut torque indicator cover includes a cover piece that is joined to an indicator piece. It is fastened to a nut/bolt assembly primarily by pressing it down onto and over the exposed threads of the bolt so that the indicator piece registers with the hex portion of the nut. A snap fit design is incorporated into the nut torque indicator cover such that the cover piece and indicator piece can rotate relative to each other. The cover piece fastens securely to the external threads of the bolt providing protection to the threads, while the indicator piece, secured by the hex flats of the nut, indicates the nut circumferential position, allowing an indication of any torque loss.

20 Claims, 8 Drawing Sheets

NUT LOOSENESS INDICATOR AND DUST CAP

BACKGROUND AND SUMMARY

This invention pertains generally to Nut Looseness or Torque Indicators. More particularly, it deals with a unique combination looseness indicator and dust cap. Nut looseness or torque indicators are installed on the wheels of many military and commercial vehicles as they provide an easy visual means for confirming or detecting the looseness of wheel lug nuts. When combined with dust caps, they also help to protect the lug nut assembly from dust and other road hazards. FIG. 1 shows the current state of the art of nut torque indicators, while FIG. 2 shows a prior art dust cap or cover for a lug nut. The nut torque indicator 1 of FIG. 1 is pressed onto a hex nut 2. A knurled surface 3 of the nut torque indicator 1 interfaces with the hex flats 4 of the hex nut 2. As the hex nut 2 rotates relative to the bolt 5, the nut torque indicator 1 rotates with it, made visible to an operator by the pointer 6. This allows a user to know if a bolted connection is losing torque. FIG. 2 shows a nut cover 7 that is used to protect the exposed external threads 8 of a bolt 5. The nut cover 7 is pressed onto the external threads 8 of the bolt 5 and are secured by tabs 9 on the inside diameter of the nut cover 7. Further examples of prior art including and combining the functions of nut torque indicators and dust covers can be found in U.S. Pat. Nos. 6,398,312; 6,561,124; and 6,595,597 by Marczynski et al.

Still, all of these prior art approaches to nut torque/looseness indicators have disadvantages. First, prior art nut torque indicators are difficult to remove from the nut once assembled. Second, many nut torque indicators do not provide any protections for the bolt threads. Third, torque indicator pointers are too long and can be damaged by rocks or road debris. Also, interference can occur with other components on the assembly that are in close proximity. However, the instant invention resolves and avoids these difficulties by teaching a design where the fastening of the nut torque indicator cover to the nut/bolt assembly is achieved primarily by pressing onto exposed threads of the bolt and secondarily to the hex portion of the nut. A snap fit design is incorporated into the nut torque indicator cover such that it consists of multiple parts that can rotate relative to each other. The cover piece fastens securely to the external threads of the bolt providing protection to the threads, while the indicator piece, interacting with the hex flats of the nut, indicates the nut circumferential position, allowing an indication of any torque loss.

The foregoing features and others of the inventive concept, as more fully described below, provide numerous advantages over the systems of prior art. To begin with, the cover piece and the indicator piece are joined by a unique snap fit design such that the two parts can rotate relative to each other. In addition, assembly and disassembly of the nut torque indicator cover is improved. The cover piece of the nut torque indicator cover fastens to the external threads of the bolt and installs simply by pressing onto the external threads. Disassembly can be accomplished by unscrewing the cover piece from the stud threads. Further, the indicator piece utilizes a smaller pointer to reduce or eliminate damage and/or interference from impacts and other hazardous environments. This also allows allows adjacent nuts to be in closer proximity than previously possible. The numerous other advantages of our invention will become more apparent in view of the more detailed description and claims that follow.

DESCRIPTION

Figure 1:
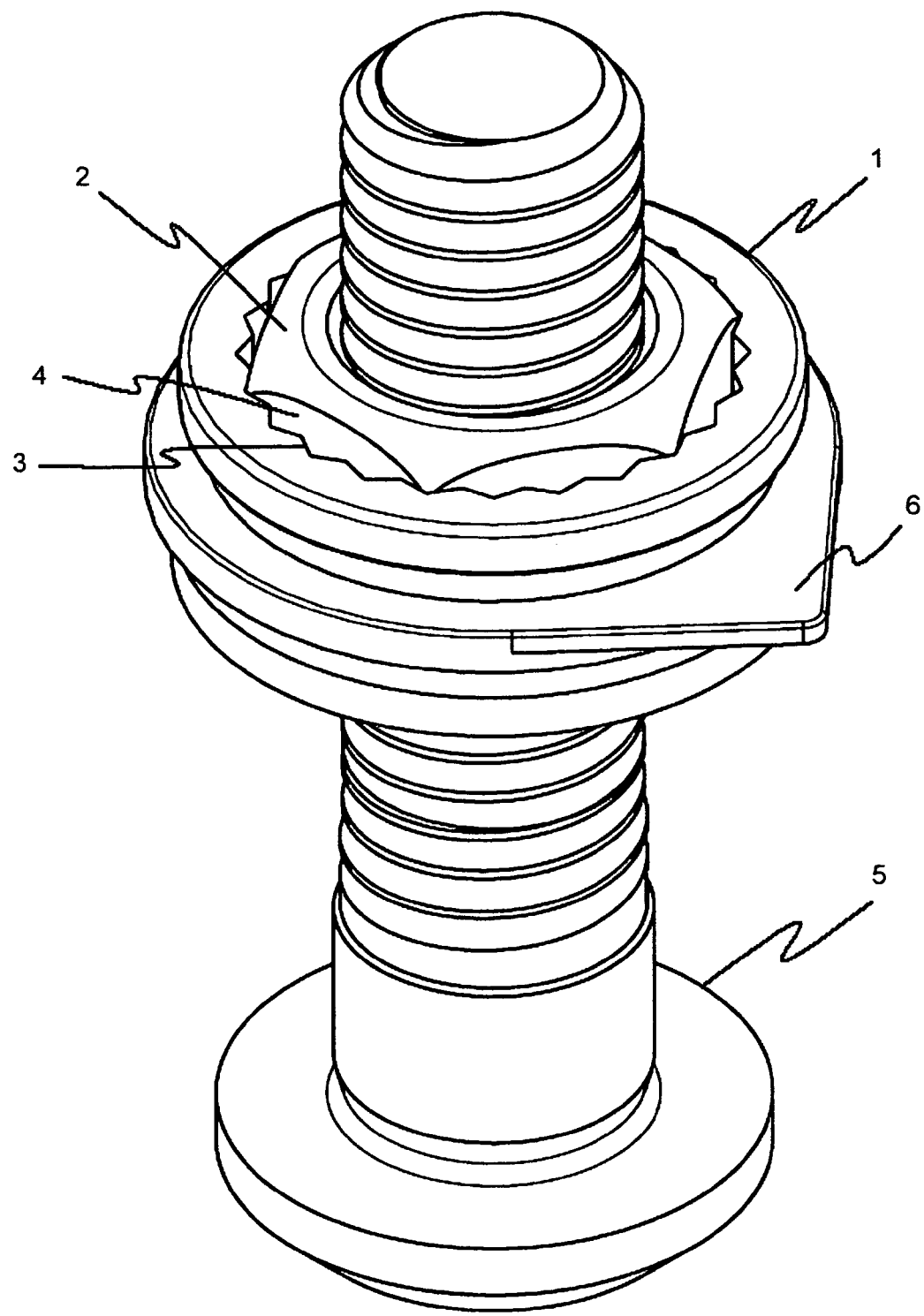
FIG. 1 provides a perspective view of a prior art nut torque indicator positioned on a hex nut.
Figure 2:
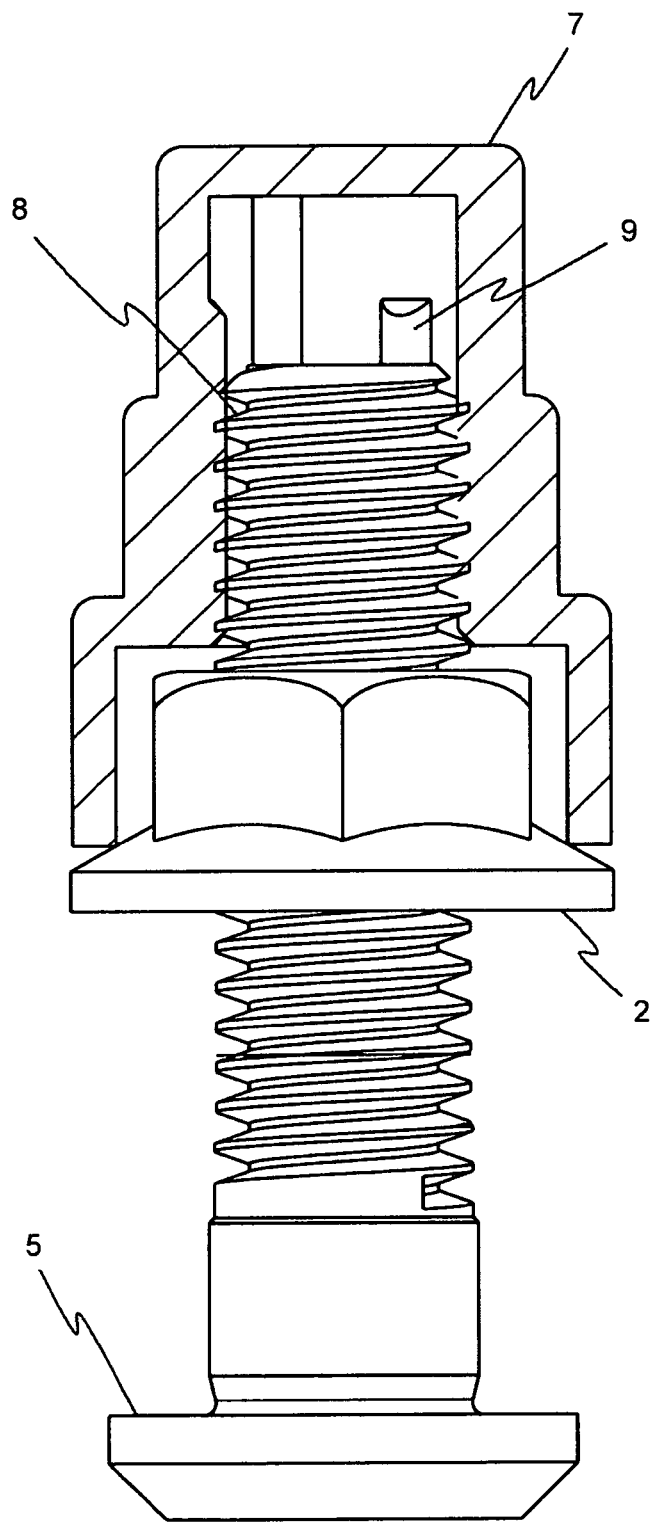
FIG. 2 provides a cross-sectional view of a prior art dust cap positioned on a hex nut.
Figure 3:
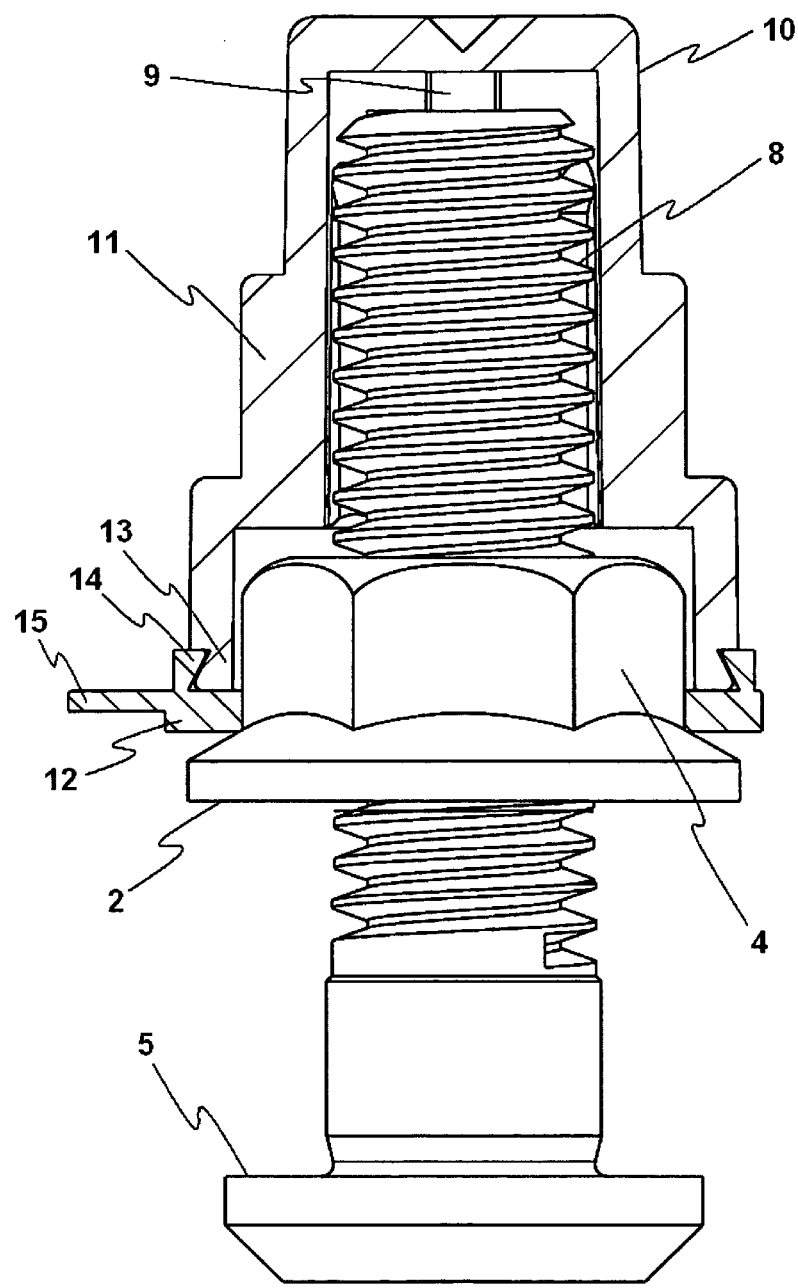
FIG. 3 provides a cross-sectional view of a preferred embodiment for the nut torque indicator cover assembly of our invention, with its cover piece and indicator piece positioned on a hex nut and bolt (shown in perspective).

FIG. 3 illustrates a cross section of a preferred embodiment of our invention, showing the nut torque indicator cover assembly 10 assembled to a hex nut 2 and bolt 5. The nut torque indicator cover assembly 10 consists of a cover piece 11 and an indicator piece 12. The cover piece 11 is secured on the bolt 5 by an interference fit between external threads 8 and bolt engagement members such as tabs 9 on the inside diameter of the cover piece 11. The indicator piece 12 interacts with the hex nut 2 via nut engagement members such as those provided by a knurled surface 3 that interfaces and forms an interference fit with the hex flats 4. The cover piece 10 can rotate relative to indicator piece 12 due to a slip fit of the interlocking cover clip 13 and indicator clip 14. An indicator pointer 15 is integrated with the indicator piece 12 to indicate the circumferential position of the hex nut 2 by an observer. Thus, the system illustrated can be simply and easily pressed down over nut 2 and bolt 5 by placing its open end (where indicator piece 12 is mounted) over and down onto bolt 5 and pressing or tapping it firmly downward onto bolt 5 until indicator piece 12 engages nut 2. Prior to engaging indicator piece 12 with nut 2, however, the pointer 15 will be oriented (as is typical of the art) towards an adjacent feature on, e.g., a wheel surface, such as another nut and bolt, so that displacement of the nut 2 from its fully tightened position can be easily detected. As will be noted, when the nut torque indicator cover assembly 10 is assembled to a hex nut 2 and bolt 5 as shown and intended, the indicator piece 12 can rotate with said nut 2 relative to bolt 5 without rotation of the cover piece 11 relative to bolt 5. Likewise, the cover piece 11 remains firmly in place and affixed to bolt 5 despite displacement or movement of indicator piece 12, and is generally removed only by unscrewing it from bolt 5.

Figure 4:
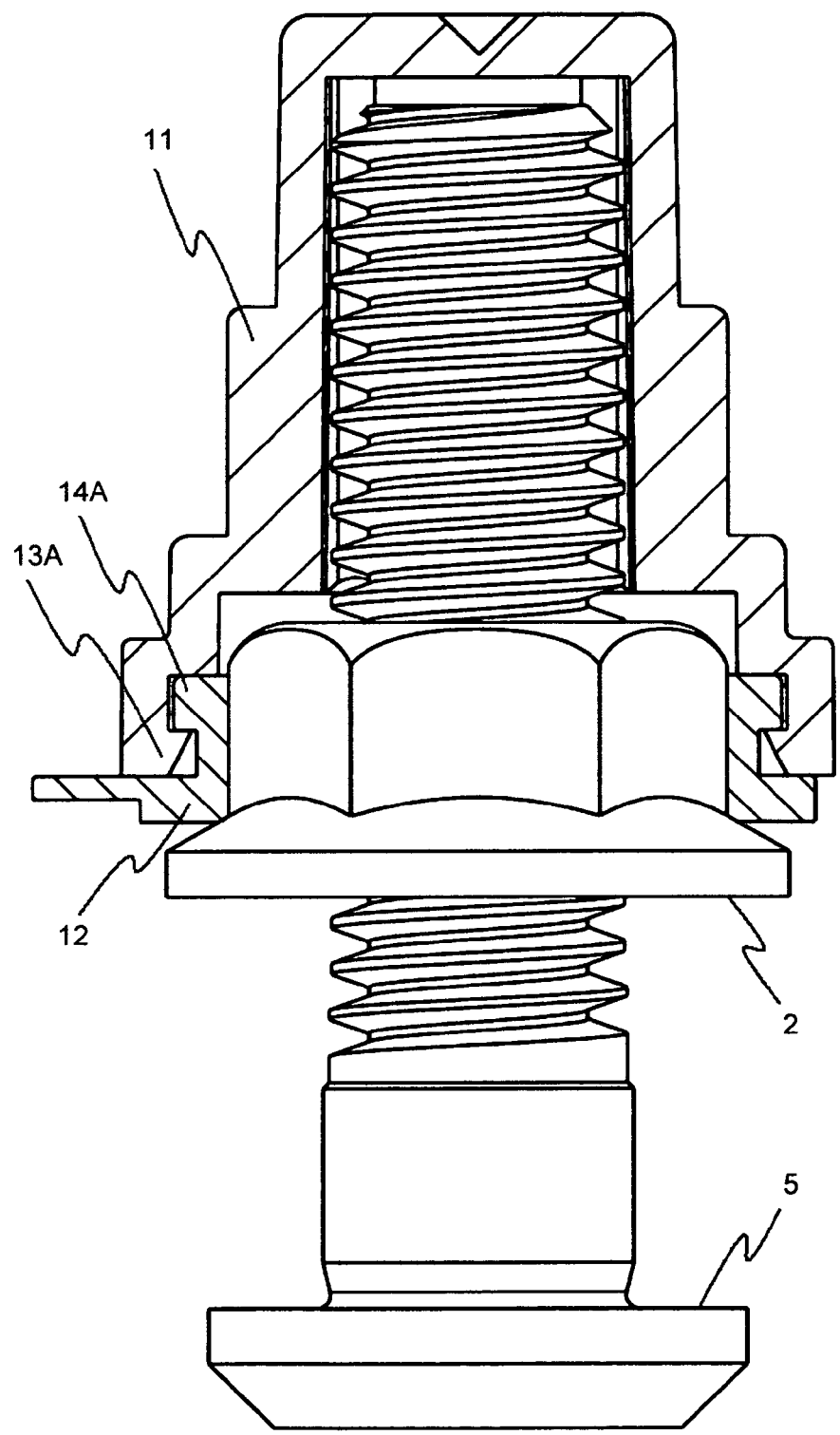
FIG. 4 provides a cross-sectional view of an alternate embodiment of the nut torque indicator cover assembly of our invention positioned on a hex nut and bolt (shown in perspective).
Figure 5:
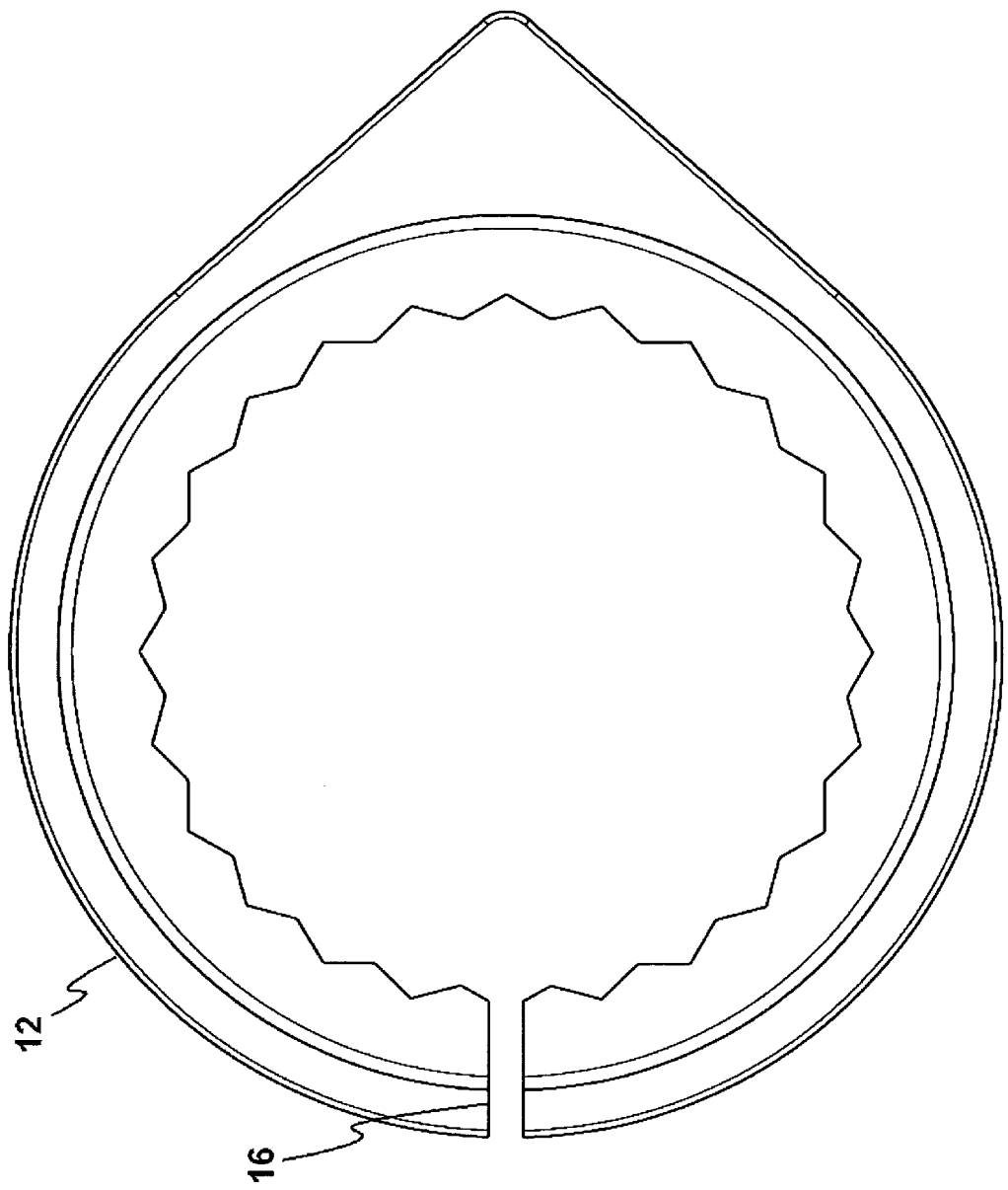
FIG. 5 illustrates an alternate configuration for the indicator piece incorporating a relief slot.
Figure 6:
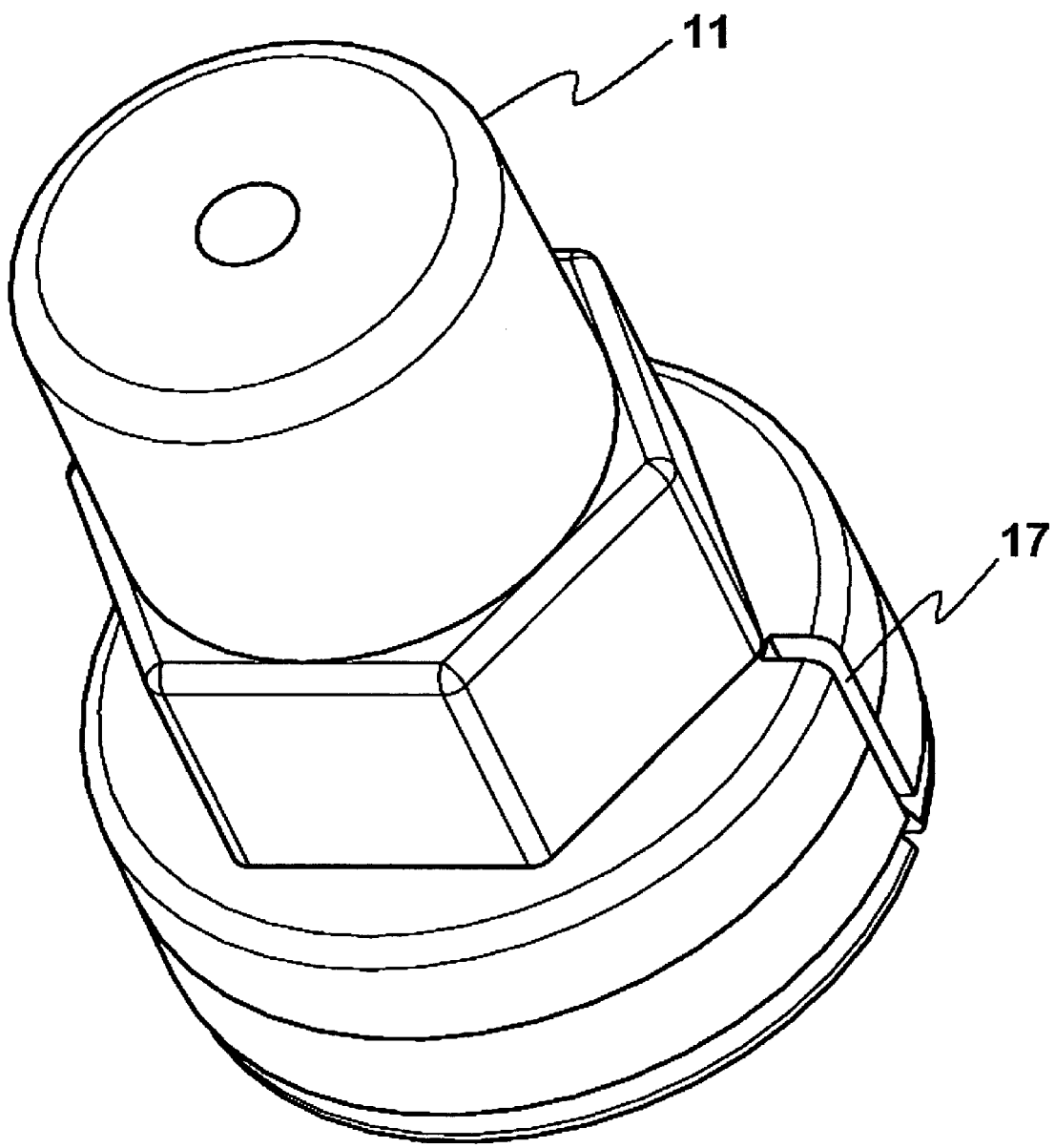
FIG. 6 provides a perspective view of an alternative configuration in which the cover piece incorporates a slot.
Figure 7:
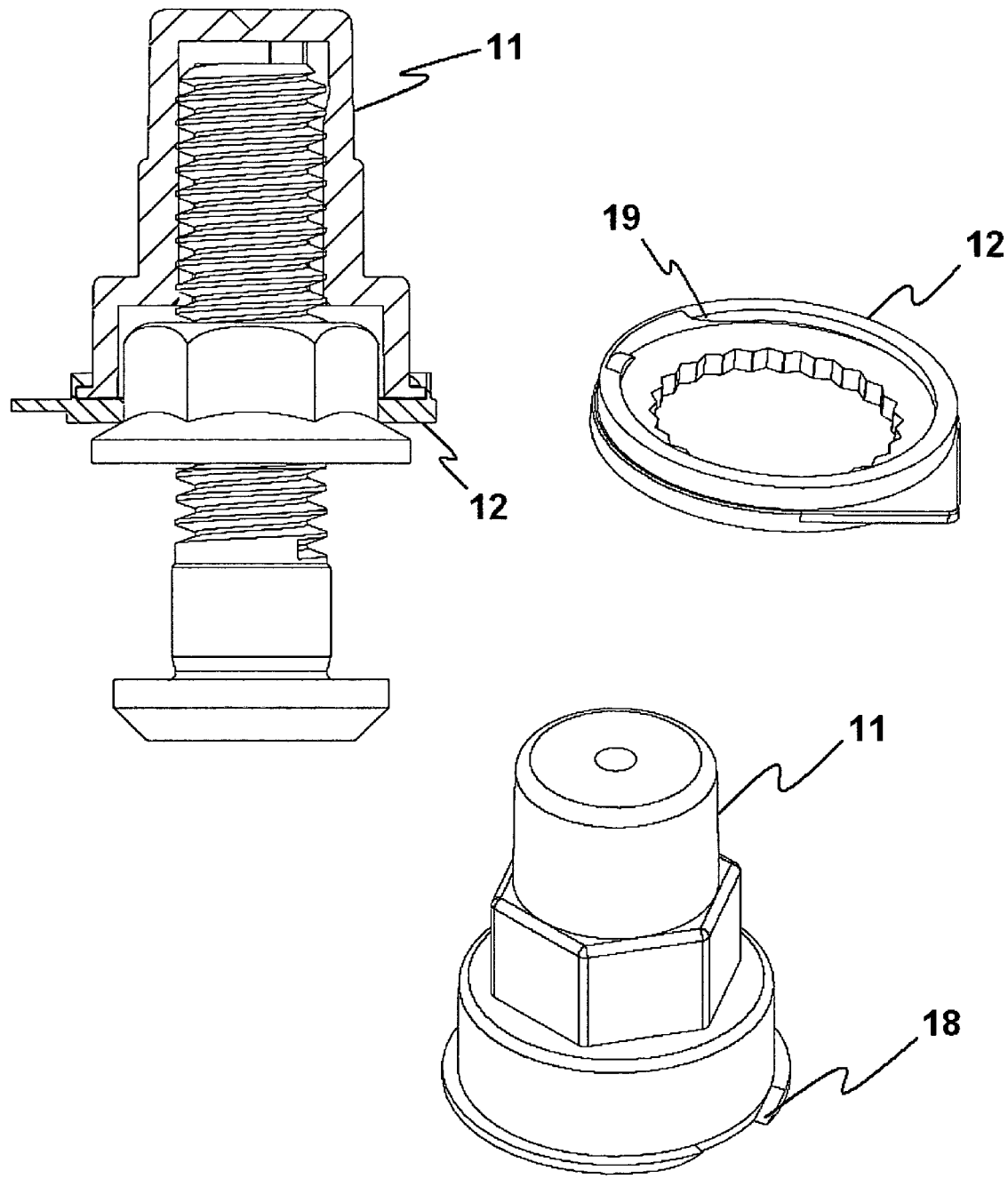
FIG. 7 provides a cross-sectional view of an embodiment of the nut torque indicator cover assembly of our invention, as well as perspective views of the cover piece and indicator piece used in forming said alternate embodiment.
Figure 8:
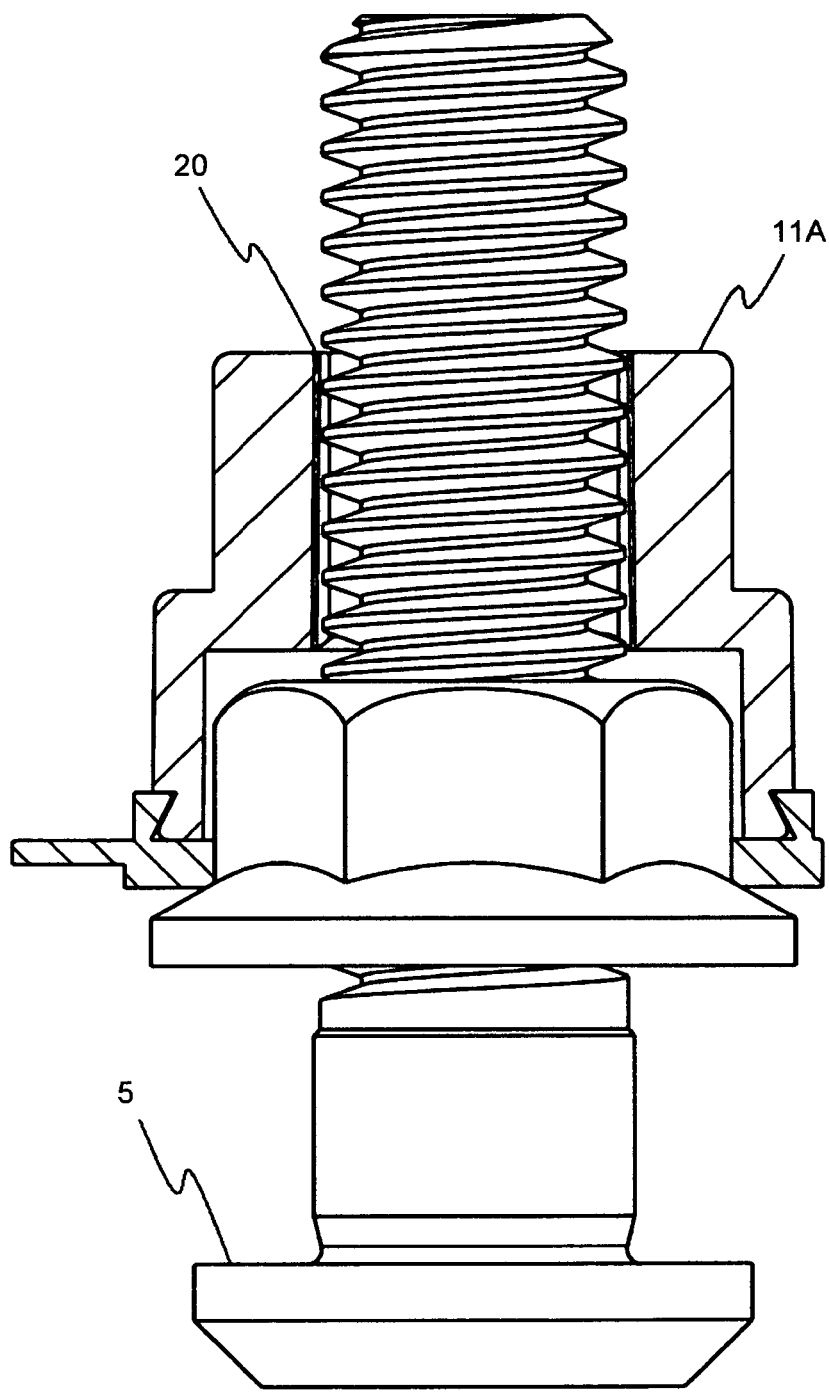
FIG. 8 provides a cross-sectional view of an embodiment of the nut torque indicator cover assembly of our invention in which the cover piece has an open end.

FIGS. 4, 5, 6, 7 and 8 show alternate configurations included with and within the inventive concept. FIG. 4 illustrates an alternative configuration for the interlocking of an the alternate cover clip 13A and an alternate indicator clip 14A. The positioning of alternate clips 13A and 14A are reversed compared to those shown in FIG. 3. The cover piece 11 snaps onto the indicator piece 12. FIG. 5 illustrates an alternative configuration in which the indicator piece 12 incorporates a relief slot 16. This slot 16 can ease the assembly of the cover piece 11 to the indicator piece 12 by allowing indicator piece to open slightly when being fitted to cover piece 11. FIG. 6 illustrates an alternative configuration in which the cover piece 11 incorporates a slot 17. This slot 17 can, in the same manner, ease the assembly of the cover piece 11 to the indicator piece 12. FIGS. 7 and 8 illustrate further variations to the configuration illustrated in FIG. 5. FIG. 7 illustrates an alternative to snap clips 13 and 14 to secure the cover piece 11 and the indicator piece 12 together. In this embodiment, the bottom of the cover piece 11 has a partial thread 18 that rotates onto a corresponding indicator partial thread 19. Finally, FIG. 8 illustrates an alternative configuration in which an alternate cover piece 11A has an open end 20 opposite the end at which indicator piece 12 is mounted; thereby allowing for easier disassembly.

The previously described advantages and features of the invention are advantageously provided through and using the preferred embodiments previously illustrated and discussed. However, numerous variations are possible without deviating from and/or exceeding the spirit and scope of the invention. In addition, various features and functions disclosed above, or alternatives thereof, may be desirably combined into many other different systems or applications. Further, various presently unforeseen or unanticipated alternatives, modifications, variations or improvements therein may be subsequently made by those skilled in the art which are also intended to be encompassed by the claims when filed.

Finally, the following parts list for the drawing figures may be found to be of assistance in understanding more fully the concepts of our invention:
1. Nut Torque Indicator (Old)
2. Hex Nut
3. Nut Torque Indicator Knurled Surface
4. Hex Nut Flats
5. Bolt
6. Nut Torque Indicator Pointer
7. Nut Cover
8. External Threads
9. Cover Tabs
10. Nut Torque Indicator Cover Assembly
11. Cover Piece
11A. Alternate Cover Piece
12. Indicator Piece
13. Cover Clip
13A. Alternate Cover Clip
14. Indicator Clip
14A. Alternate Indicator Clip
15. Indicator Pointer
16. Indicator Slot
17. Cover Slot
18. Cover Thread
19. Indicator Thread
20. Cover Open End

What is claimed is:

1. A position indicator assembly for use with a nut and a bolt which are or are to be threadedly engaged with each other, the assembly comprising:
    a cover piece having an open first end, a second end, and an open interior region with bolt engagement members such that the first end can be pressed down over the bolt and said bolt engagement members will engage said bolt so as to affix said cover piece thereto; and
    an indicator piece having a pointer for orientation in a preferred direction, which indicator piece is rotatably mounted to said cover piece adjacent said first end and has nut engagement members such that when said first end is pressed down over said bolt the indicator piece can engage said nut so as to be rotatable with said nut.

2. The position indicator assembly of claim 1, wherein said assembly has at least one of: bolt engagement members formed by tabs located on surfaces of said interior region of said cover piece, and nut engagement members formed by knurled surfaces of said indicator piece.

3. The position indicator assembly of claim 1, wherein when said cover piece is pressed down over the bolt such that the indicator piece has engaged said nut, said indicator piece can rotate with said nut relative to said bolt without rotation of the cover piece relative to said bolt.

4. The position indicator assembly of claim 1, wherein when said cover piece is pressed down over the bolt such that said bolt engagement members engages said bolt, said position indicator assembly is removable from said nut and bolt by unscrewing said cover piece from said bolt.

5. The position indicator assembly of claim 1, wherein interlocking clips positioned at an interface between the cover piece and the indicator piece form a slip fit juncture between said cover piece and said indicator piece.

6. The position indicator assembly of claim 5, wherein said slip fit juncture is formed by one of: snapping said cover piece and said indicator piece together, and joining said cover piece and indicator piece together via a partial thread.

7. The position indicator assembly of claim 6, wherein any snapping of said cover piece and said indicator piece together is facilitated by the presence of a relief slot in one of the cover piece and the indicator piece.

8. The position indicator assembly of claim 1, wherein said cover piece has an open second end.

9. A position indicator assembly for use with a nut and a bolt which are or are to be threadedly engaged with each other, the assembly comprising:
    a cover piece having an open first end, a second end, and an open interior region with bolt engagement members such that the first end can be pressed down over the bolt and said bolt engagement members will engage said bolt so as to affix said cover piece thereto;
    an indicator piece having a pointer for orientation in a preferred direction, which indicator piece is rotatably mounted to said cover piece adjacent said first end and has nut engagement members such that when said first end is pressed down over said bolt the indicator piece can engage said nut so as to be rotatable with said nut;
    wherein said assembly has at least one of: bolt engagement members formed by tabs located on surfaces of said interior region of said cover piece, and nut engagement members formed by knurled surfaces of said indicator piece; and
    wherein when said cover piece is pressed down over the bolt such that the indicator piece has engaged said nut, said indicator piece can rotate with said nut relative to said bolt without rotation of the cover piece relative to said bolt.

10. The position indicator assembly of claim 9, wherein when said cover piece is pressed down over the bolt such that said engagement member engages said bolt, said position indicator assembly is removable from said nut and bolt by unscrewing said cover piece from said bolt.

11. The position indicator assembly of claim 9, wherein interlocking clips positioned at an interface between the cover piece and the indicator piece form a slip fit juncture between said cover piece and said indicator piece.

12. The position indicator assembly of claim 11, wherein said slip fit juncture is formed by one of: snapping said cover piece and said indicator piece together, and joining said cover piece and indicator piece together via a partial thread.

13. The position indicator assembly of claim 12, wherein any snapping of said cover piece and said indicator piece together is facilitated by the presence of a relief slot in one of the cover piece and the indicator piece.

14. The position indicator assembly of claim 9, wherein said cover piece has an open second end.

15. A method for using a position indicator assembly with a nut and a bolt which are or are to be threadedly engaged with each other, the method comprising:

providing a position indicator assembly having a cover piece and an indicator piece, with said cover piece having an open first end, a second end, and an open interior region with bolt engagement members such that the first end can be pressed down over the bolt and said bolt engagement members will engage said bolt so as to affix said cover piece thereto, and with said indicator piece having a pointer for orientation in a preferred direction, which indicator piece is rotatably mounted to said cover piece adjacent said first end and has nut engagement members such that when said first end is pressed down over said bolt the indicator piece can engage said nut so as to be rotatable with said nut;

pressing the first end of said cover piece down over the bolt so as to be affixed thereto with said indicator piece engaging said nut; and wherein the pointer of said indicator piece is oriented in said preferred direction before engaging said indicator piece with said nut.

16. The method of claim 15, wherein said assembly has at least one of: bolt engagement members formed by tabs located on surfaces of said interior region of said cover piece, and nut engagement members formed by knurled surfaces of said indicator piece.

17. The method of claim 15, wherein when said cover piece is pressed down over the bolt such that the indicator piece has engaged said nut, said indicator piece can rotate with said nut relative to said bolt without rotation of the cover piece relative to said bolt; and wherein when said cover piece is pressed down over the bolt such that said engagement member engages said bolt, said position indicator assembly is removable from said nut and bolt by unscrewing said cover piece from said bolt.

18. The method of claim 15, wherein interlocking clips positioned at an interface between the cover piece and the indicator piece form a slip fit juncture between said cover piece and said indicator piece, and said slip fit juncture is formed by one of snapping said cover piece and said indicator piece together, and joining said cover piece and indicator piece together via a partial thread.

19. The method of claim 18, wherein any snapping of said cover piece and said indicator piece together is facilitated by the presence of a relief slot in one of the cover piece and the indicator piece.

20. The method of claim 15, wherein said cover piece has an open second end.

\* \* \* \* \*